United States Patent [19]

Pai Verneker

[11] Patent Number: 4,751,070

[45] Date of Patent: Jun. 14, 1988

[54] LOW TEMPERATURE SYNTHESIS

[75] Inventor: Vencatesh R. Pai Verneker, Baltimore, Md.

[73] Assignee: Martin Marietta Corporation, Bethesda, Md.

[21] Appl. No.: 852,470

[22] Filed: Apr. 15, 1986

[51] Int. Cl.$^4$ ............................................. C01G 49/02
[52] U.S. Cl. .................... 423/592; 423/593; 423/594; 423/595; 423/596; 423/598; 423/599; 423/600; 423/604; 423/607; 423/608; 423/622; 423/625; 423/632; 423/635; 423/277; 423/325; 423/326; 252/62.54; 252/62.56; 252/62.62; 501/94; 501/103; 501/108; 501/112; 501/117; 501/118; 501/120; 501/126; 501/127; 501/132
[58] Field of Search ............... 75/0.5 AA; 252/62.54, 252/62.56, 62.62; 423/632, 592, 593, 594, 595, 596, 598, 599, 600, 604, 607, 608, 622, 625, 635, 277, 325, 326; 501/94, 103, 108, 112, 117, 118, 120, 126, 127, 132

[56] References Cited

U.S. PATENT DOCUMENTS 4,076,861  2/1978  Furukawa et al. ............. 75/0.5 AA
4,125,474  11/1978  Dezawa et al. ................. 252/62.56

OTHER PUBLICATIONS

Lal & Ramakrishman, *Trans. Indian Cer. Soc.*, vol. 38 (5), pp. 166–180, Sep.–Oct. 1979.
DAS, *Preparation and Characterization of Materials*, Honig & Rao, eds., Academic Press, pp. 75–100, 1981.
Richardson, *Journal of Materials Science*, vol. 15, pp. 2569–2572, 1980.
Patil, Gajepathy, and PaiVernecker, *Mat. Res. Bull.*, vol. 17, pp. 29–32, 1982.
Patil, Gajapathy, and PaiVernecker, *Journal of Material Science Letters*, vol. 2, pp. 272–274, 1983.

*Primary Examiner*—Robert L. Stoll
*Attorney, Agent, or Firm*—Herbert W. Mulius; Gay Chin

[57] ABSTRACT

Ultrafine particles of ceramic or metallic material are obtained at low temperatures from a nitrate source capable of endothermic decomposition by molecularly combining under a nitrogen atmosphere the nitrate source with an inorganic reducing fuel compound, such as hydrazine, to provide a chemical precursor for the ceramic or metallic material and then exothermically decomposing the precursor in a controlled atmosphere by heating to a temperature up to about 200° C. below the endothermic decomposition temperature of the nitrate source. The nitrate source is a metal nitrate or a mixture of nitrate salts. Ferrite particles are recovered when the nitrate source is a mixture of nitrate salts containing ferric nitrate in a 2:1 molar ratio with at least one additional metal nitrate.

24 Claims, No Drawings

LOW TEMPERATURE SYNTHESIS

TECHNICAL FIELD

This invention relates to the preparation of ultrafine particles of metals, alloys and ceramic materials including ferrites. More specifically, the invention relates to the low temperature synthesis of such materials.

BACKGROUND OF THE INVENTION

Ferrites are important materials to industry because of their wide use as magnetic materials and as catalysts. The synthesis of submicron sized ferrite powders has generally received particular attention due to a number of factors including higher green densities and improved electric, magnetic and surface properties. Low temperature syntheses of such materials have been found to generally result in finer particles but have also been the focus of much interest because of unique or unusual particle forms and chemical stoichiometry considerations.

Traditional techniques for the preparation of fine particles of ferrites and ceramic materials in general have involved repeated firings of the component oxides, hydroxides, or carbonates at high temperatures with frequent grindings and mixings. The result is usually crystalline but inhomogeneous materials having low surface area. To induce better diffusion and homogeneity, chemical precursor techniques such as, for example, electrolytic coprecipitation, coprecipitation of oxalates, spray drying of mixed sulfate solutions, and thermal decomposition of mixed metal acetate complexes have been known in the art. Two reviews have been published on the topic: R. Lal and P. Ramakrishman, *Trans. Indian Cer. Soc.* 38, 166, 1979, and B. K. Das, *Preparation and Characterization of Materials*, Honig & Rao, Eds., Academic Press, 75, 1981. The advantage in using precursor techniques has been the production of homogeneous, well mixed oxides at reduced formation temperatures. However, even though the reported synthesis temperatures for these techniques are lower than those required in conventional ceramic syntheses, there is positively a need in the art to lower synthesis temperatures further.

A typical chemical precursor, such as ferric oxalate or ferric nitrate, is an oxidizer or has an oxygen-containing anion and can be decomposed endothermically to produce an oxide residue, such as $\gamma Fe_2O_3$. It is well known that the time required for such decompositions can be considerably shortened if the precursor is heated in the presence of a reducing agent, such as hydrazine. The metal salts are normally reduced in solution and yield metal powders.

A relevant chemical precursor method which has recently been reported involves the preparation of ferromagnetic spinels, such as $MnFe_2O_4$, $CoFe_2O_4$ and $NiFe_2O_4$, by the thermal decomposition of mixtures of pyridine and pyridine-1-oxide complexes of the corresponding metal nitrates. See R. T. Richardson, *J. of Mat. Sc.* 15, 2569, 1980. Using this technique, amorphous oxides in a glassy state are formed between 300° and 400° C. and crystallization takes place at temperatures between 800° and 1000° C. Due to the use of the organic pyridine, however, there is a real possibility of carbon contamination in the ferrite products.

The applicant herein has prepared and decomposed mixed metal oxalate hydrazinate precursors at temperatures as low as 120° to 200° C. to yield oxide spinels such as ferrites and cobaltites. See K. C. Patil, D. Gajapathy, V. R. Pai Verneker, *Mater. Res. Bull.* 17, 29, 1982, and *J. of Mat. Sci. Letters* 2, 272, 1983. The approach for these syntheses is the incorporation of an inorganic reducing fuel molecule, such as hydrazine, within the metal salt molecules yielding precursor molecules which are capable of rapid decomposition in air to the corresponding oxides.

A typical synthesis begins with the preparation of the precursor by dissolving the oxalate or oxalates (single or double salt synthesis, respectively) into excess liquid hydrazine hydrate according to the following formula:

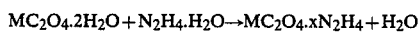

$$MC_2O_4.2H_2O + N_2H_4.H_2O \rightarrow MC_2O_4.xN_2H_4 + H_2O$$

where M may be a metal such as manganese, iron, nickel, cobalt, titanium, cadmium, magnesium, aluminum, boron, etc. and x is an integer dependent on the valency of the metal. Alternatively, the oxalate hydrazinate precursor may be prepared from one or more metal powders and ammonium oxalate as follows:

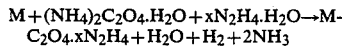

$$M + (NH_4)_2C_2O_4.H_2O + xN_2H_4.H_2O \rightarrow MC_2O_4.xN_2H_4 + H_2O + H_2 + 2NH_3$$

where M and x are the same as above. The precursor is thereafter recovered, placed in a reactor and heated to a temperature up to 200° C. in air for 30 to 90 minutes to decompose the oxalate hydrazinate. Thus, for example, if ferric oxalate is converted into ferric oxalate hydrazinate, a coordination compound of oxalate and hydrazine, this precursor decomposes exothermically at as low a temperature as 120° C. producing fine amorphous $\gamma Fe_2O_3$ particles which are highly magnetic and capable of high green density. Crystallization of these particles takes place at around 340° C. Ultrafine particles of iron may be produced if the decomposition is carried out under nitrogen, hydrogen or vacuum conditions. Similarly, double precursor salts, such as $MgFe_2(C_2O_4)_3.5N_2H_4$, produce ceramic materials such as $MgFe_2O_4$ on heating in air and alloys such as $MgFe_2$ on heating under hydrogen or vacuum conditions.

The Present Invention

This invention is based on the discovery that ultrafine particles of ceramic or metallic materials can be obtained at very low temperatures from a nitrate source capable of endothermic decomposition by molecularly combining under a nitrogen atmosphere the nitrate source with an inorganic reducing fuel to provide a chemical precursor for the particular ceramic or metallic material and then exothermically decomposing the precursor in a controlled atmosphere by heating to a temperature up to about 200° C. below the endothermic decomposition temperature of the nitrate source.

The preferred reducing fuel compound is hydrazine and the molecular combination is obtained by treating the nitrate source with hydrazine hydrate. Since hydrazine is inorganic, there is no possibility of contamination of the products prepared according to this invention.

The nitrate source may be any one or more of the nitrate salts of metals such as iron, cobalt, nickel, manganese, chromium, titanium, zirconium, aluminum, magnesium, zinc, cadmium, copper, boron and silicon. Upon the absorption of sufficient heat, such salts are known to decompose to elemental or oxide forms of the metal or metals, depending on the particular conditions of the decomposition.

In the preparation of a simple metal oxide ceramic according to this invention, the nitrate source is the corresponding nitrate salt. For example, to obtain $Fe_2O_3$, the nitrate source is $Fe(NO_3)_3$. Such a salt is treated under nitrogen conditions with hydrazine hydrate to produce a solid reaction product. This treatment molecularly combines the nitrate salt with one or more hydrazine molecules resulting in a coordination compound of the nitrate salt and hydrazine. Thus, in the immediate example, $Fe(NO_3)_3 \cdot 5N_2H_4$ is formed by the treatment of $Fe(NO_3)_3$ with hydrazine hydrate. Other nitrate salts, such as $Al(NO_3)_3$ and $Zr(NO_3)_4$, react similarly with hydrazine hydrate to produce similar complexes.

For a double salt synthesis, such as is used for the preparation of ferrites according to this invention, two or more nitrate salts are simultaneously treated with hydrazine hydrate. For example, a $MgFe_2(NO_3)_6 \cdot 5N_2H_4$ complex may be prepared by molecularly reacting a mixture of ferric nitrate and magnesium nitrate with hydrazine. The mixture must contain the ferric ion in a 2:1 molar ratio with at least one other metal ion to provide a ferrite precursor.

The solid coordination compounds thus produced provide chemical precursors for the low temperature syntheses of the desired and metallic materials. The complexes, in fact, have been found to proceed along a route to ultimate decomposition even at temperatures ranging from near room temperature to about 90° C. However, the decomposition progresses rapidly as the solids are heated to 100° C. and beyond and is accompanied by the liberation of heat. The peak temperatures reached during the decompositions are, on the average, about 200° C. below the endothermic decomposition temperatures for the respective nitrate salts. For example, precursor compounds for the simple oxides $Fe_2O_3$, $Al_2O_3$ and $ZrO_2$ decompose exothermically in air at peak temperatures of 100° C., 260° C. and 500° C., respectively. For the ferrites, the precursors decompose exothermically in air at a peak temperature of about 100° C. The decompositions generally require less than 30 minutes.

The decomposition products are ultrafine or submicron-sized particles of the desired ceramic or metallic material, depending on the particular decomposition conditions. Thus, decompositions conducted in air result in oxygen-containing ceramics whereas those under nitrogen, hydrogen or vacuum conditions result in free metals or alloys. The latter conditions, for example, may be employed for the decomposition of double nitrates of iron and boron or titanium and boron to produce $FeB$ and $TiB_2$, respectively.

EXAMPLE 1

A mixture of $Ni(NO_3)_2 \cdot 6H_2O$, $Zn(NO_3) \cdot 6H_2O$ and $Fe(NO_3)_3 \cdot 9H_2O$ in a 1:1:4 molar ratio is treated with an excess of hydrazine hydrate, $N_2H_4 \cdot H_2O$, in an open vessel. In order to avoid a violent reaction, the addition of the first third of the hydrazine hydrate must be very slow. The color of the metal nitrate mixture turns dark brown immediately upon contact with $N_2H_4 \cdot H_2O$. After the addition of excess $N_2H_4 \cdot H_2O$ is complete and the white fumes subside, the heterogeneous mixture of solid metal salts and the liquid $N_2H_4 \cdot H_2O$ is purged with nitrogen in a closed vessel and stirred for several days. Thereafter, the resulting double salt precursor is filtered, washed with distilled water and allowed to dry in air. The solids are then heated in air at temperatures within the range of 90 to 100° C. for approximately 30 minutes to yield a nickel zinc ferrite.

The composition of the ferrite is determined by chemical, IR and X-ray analysis to be $Ni_{0.5}Zn_{0.5}Fe_2O_4$. A picture provided by a scanning electron microscope (SEM) shows that the ferrite powders are spherical particles which are very similar to a commercial nickel zinc ferrite sold under the trade designation TT2-111 by Trans-Tech Corporation of Maryland. However, the surface area of the ferrite powders prepared according to this example is 6.2 m2/g which is four times that of the commercial ferrite. The magnetic properties of the powders, as compared with the commercial product, are as follows:

|  | Example | TT2-111 |
| --- | --- | --- |
| Saturation Magnetization (emu/g) | 76.4 | 76.7 |
| Residual Magnetization (emu/g) [Br] | 0.0 | 1.1 |
| Magnetic Cohesive Energy (Oe) [Hc] | 0.0 | 11.5 |

EXAMPLE 2

The procedure of the preceding example is repeated except that the nitrate hydrazinate-excess hydrazine hydrate mixture is saturated with $CO_2$ to yield $Ni_{0.5}Zn_{0.5}Fe_2(N_2H_3COO)_6 \cdot 6N_2H_4$. On decomposition in air, this precursor compound gives the same nickel zinc ferrite. On the other hand, if the decomposition is carried out in hydrogen or under a vacuum, an iron alloy with nickel and zinc is formed having submicron particle size.

By procedures similar to the above examples, a variety of submicron materials have been prepared, including $\gamma Fe_2O_3$, tetragonal zirconium oxide, amorphous $Al_2O_2$, $TiO_2$ and lead titanate, as well as the corresponding metals and alloys.

The invention has been described with special regard for certain preferred embodiments. Modifications and changes that would be obvious to a skilled artisan may be made in the disclosed method, however, without departing from the spirit and scope of the invention which is defined by the appended claims.

What is claimed is:

1. A method for synthesizing sub-micron particles of ceramic materials from a non-aqueous nitrate source capable of endothermic decomposition, said nitrate source comprising at least one nitrate salt of iron, cobalt, nickel, manganese, chromium, titanium, zirconium, aluminum, magnesium, zinc, cadmium, copper, boron, or silicon, said method comprising the steps of molecularly combining said nitrate source with an inorganic reducing fuel selected from hydrazine and hydrazine hydrate, under a nitrogen atmosphere, to provide a metal nitrate hydrazinate coordination compound chemical precursor of said ceramic material, and thereafter exothermically decomposing said precursor under an atmosphere selected from nitrogen, hydrogen, or vacuum by heating to a temperature up to about 200° C. below the endothermic decomposition temperature of said nitrate source.

2. The method according to claim 1 wherein said atmosphere comprises oxygen, and sub-micron particles of the ceramic are recovered.

3. The method according to claim 2 wherein said nitrate salt is ferric nitrate.

4. The method according to claim 2 wherein said nitrate salt is aluminum nitrate.

5. The method according to claim 2 wherein said nitrate salt is selected from zirconium and titanium nitrates.

6. The method according to claim 2 wherein said nitrate source is a mixture of two or more of said nitrate salts.

7. The method according to claim 6 wherein one of said nitrate salts is ferric nitrate.

8. The method according to claim 7 wherein said nitrate salts comprise ferric nitrate, nickel nitrate, and zinc nitrate, in a 4:1:1 molar ratio.

9. The method according to claim 6 wherein said nitrate salts comprise lead nitrate and titanium nitrate.

10. A method according to claim 2 wherein said precursor is exothermically decomposed by heating to a temperature up to about 100° C., and said ceramic is iron-containing.

11. A method according to claim 10 wherein sub-micron particles of $\gamma$ $Fe_2O_3$ are recovered.

12. The method according to claim 10 wherein said nitrate source is a mixture of nitrate salts containing ferric nitrate in a 2:1 molar ratio with at least one additional metal nitrate.

13. The method according to claim 12 wherein sub-micron particles of ferrite are recovered.

14. The method according to claim 13 wherein said nitrate salts comprise ferric nitrate, nickel nitrate and zinc nitrate in a 4:1:1 molar ratio.

15. A method for synthesizing sub-micron ferrite particles from a non-aqueous nitrate source which comprises a mixture of ferric nitrate in a 2:1 molar ratio with at least one additional nitrate salt of iron, cobalt, nickel manganese, chromium, titanium, zirconium, aluminum, magnesium, zinc, cadmium, copper, boron, or silicon, salt method comprising the steps of molecularly combining said nitrate source with an inorganic reducing fuel selected from hydrazine and hydrazine hydrate under a nitrogen atmosphere, to provide a metal nitrate hydrazinate coordination compound chemical precursor for said ferrite, and thereafter exothermically decomposing said precursor in an oxygen-containing atmosphere by heating to a temperature up to about 100° C.

16. The method according to claim 15 wherein said nitrate source is a mixture of ferric nitrate, nickel nitrate, and zinc nitrate in a 4:1:1 ratio.

17. A method for synthesizing sub-micron particles of metallic material from a non-aqueous nitrate source capable of endothermic decomposition, said nitrate source comprising at least one nitrate salt of iron, cobalt, nickel, manganese, chromium, titanium, zirconium, aluminum, magnesium, zinc, cadmium, copper, boron or silicon, said method comprising the steps of molecularly combining said nitrate source with hydrazine hydrate under a nitrogen atmosphere, to provide a metal nitrate hydrazinate coordination compound chemical precursor for said metallic material, and thereafter exothermically decomposing said precursor under an atmosphere selected from nitrogen, hydrogen, or vacuum by heating to a temperature up to about 200° C. below the endothermic decomposition temperature of said nitrate source.

18. A method according to claim 17 wherein nitrate source is a mixture of two or more of said nitrate salts.

19. The method according to claim 18 wherein said nitrate salts include ferric nitrate and at least one additional metal nitrate.

20. The method according to claim 19 wherein said nitrate salts comprise ferric nitrate and boron nitrate.

21. The method according to claim 19 wherein said nitrate salts comprise ferric nitrate and magnesium nitrate.

22. A method for synthesizing sub-micron particles of an iron-containing metallic material from a non-aqueous nitrate source which includes ferric nitrate, the method including the steps of molecularly combining said nitrate source with an inorganic reducing fuel selected from hydrazine and hydrazine hydrate under a nitrogen atomosphere, to provide a metal nitrate hydrazinate coordination compound chemical precursor for said metallic material, and thereafter exothermically decomposing aid precursor an atmosphere selected from hydrogen-containing, nitrogen-containing, and vacuum, by heating to a temperature up to about 100° C.

23. The method according to claim 22 wherein sub-micron particles of iron are recovered.

24. The method according to claim 22 wherein said nitrate source is a mixture of nitrate salts containing ferric nitrate in a 21 molar ratio with at least one additional nitrate salt of iron, cobalt, nickel, manganese, chromium, titanium, zirconium, aluminum, magnesium, zinc, cadmium, copper, borom or silicon.

* * * * *